Aug. 31, 1926.
A. L. HALLIDAY
COMMUTATOR DRESSER
Filed June 2, 1925    2 Sheets-Sheet 1
1,598,077
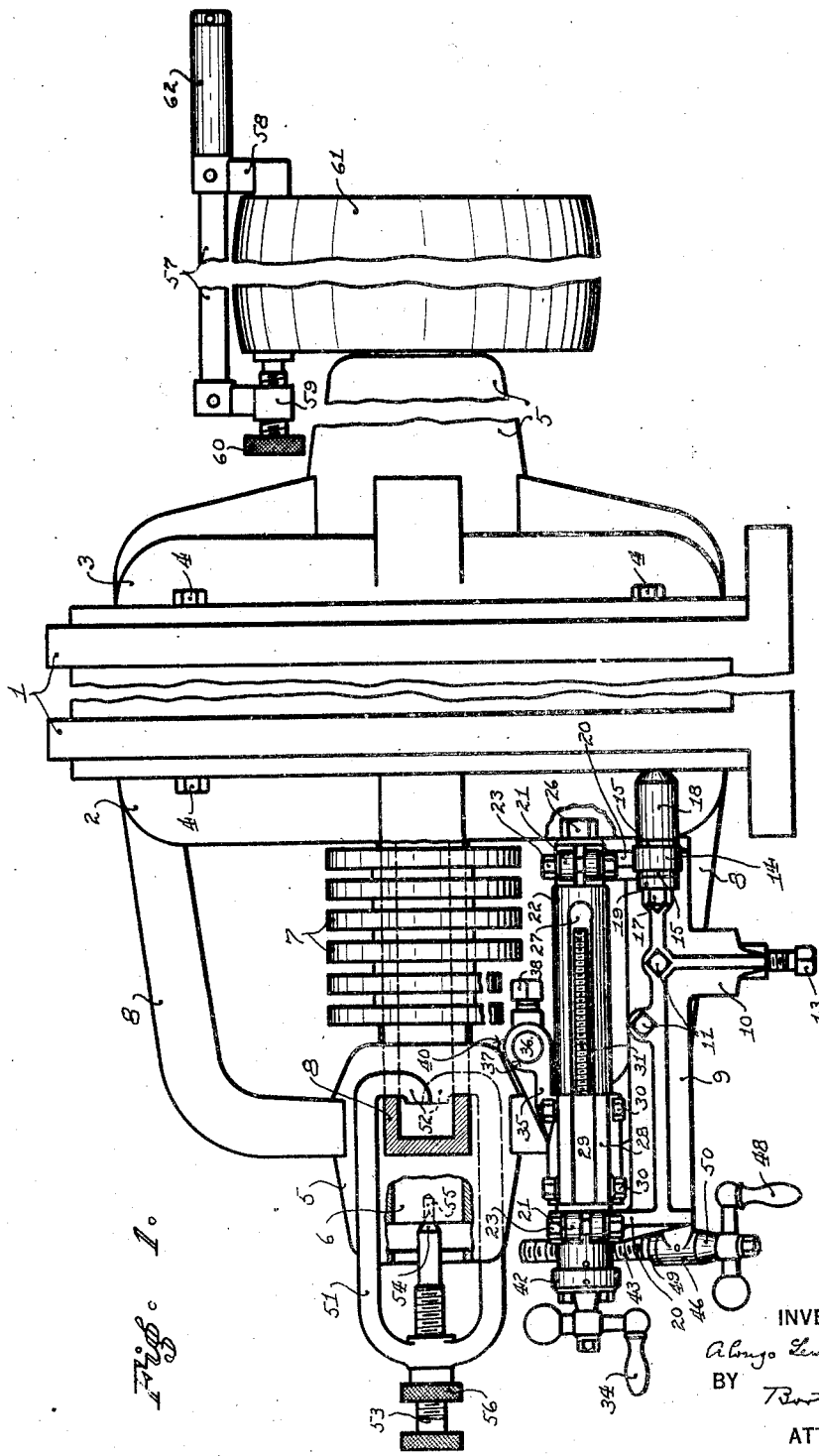
INVENTOR
Alonzo Lewis Halliday
BY
ATTORNEYS

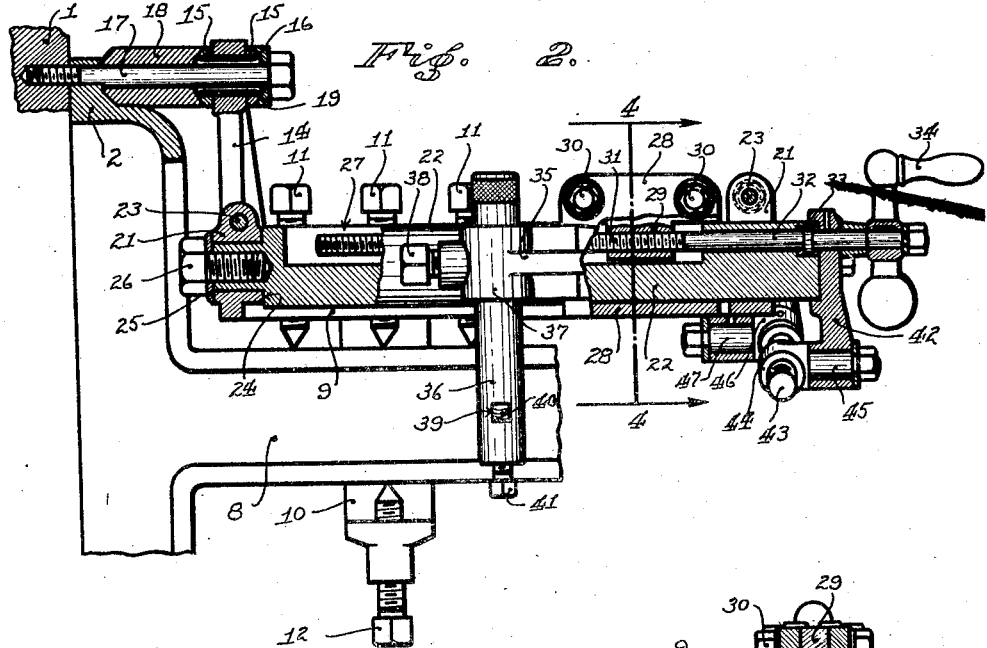

Patented Aug. 31, 1926.

1,598,077

UNITED STATES PATENT OFFICE.

ALONZO LEWIS HALLIDAY, OF OIL CENTER, CALIFORNIA.

COMMUTATOR DRESSER.

Application filed June 2, 1925. Serial No. 34,503.

My invention relates to a device for dressing or turning down the commutators or collector rings of rotary electric machines such as motors, generators, or the like.

The object of my invention is to provide a portable device, which can be easily and quickly attached to an electric machine, and utilized for dressing or smoothing the commutator or collector rings thereof. Such commutators or rings commonly become pitted or roughened after a period of use, causing sparking at the brushes with consequent loss of power and increased wear, and it is the usual practice in such cases to dismantle the machine, swing the entire rotor or armature in a lathe, and turn down the commutator or collector rings to a smooth surface. By the use of a device embodying my present invention, however, the commutator or rings can be turned down or smoothed without dismantling the machine or removing its armature, thereby effecting a great saving of both labor and time.

For purposes of illustration, my device is shown in the accompanying drawings as attached to a well known type of motor having collector rings, but it will be obvious that it may be used with equal facility upon motors having segmental commutators, or upon generators or other rotary electrical machines. It is to be understood, moreover, that the form, proportion and construction of the several parts of the device may be varied, within the limits of the claims hereto appended, without departing from the spirit of the invention as set forth in said claims.

My device is not intended as a permanent attachment for motors and the like, but is to be secured thereto only during the operation of dressing the commutator or collector rings, and removed at the conclusion of such operation. The form of attaching means shown herein makes it applicable to a wide variety of motors and generators, and by obvious modification of the dimensions and arrangement of such attaching means, the device may be adapted to any electrical machine.

A device embodying my invention will now be fully described with reference to the accompanying drawings, wherein—

Fig. 1 is a partly broken side elevation of my device in operative position upon a motor.

Fig. 2 is a partly broken horizontal section showing a portion of the motor frame with my device secured thereto.

Fig. 3 is a part sectional end elevation, as viewed from the right of Fig. 2.

Fig. 4 is a transverse section taken in the direction of the arrows on the line 4—4 of Fig. 2.

In the drawings, and referring for the moment to Fig. 1 thereof, the reference numeral 1 designates the central portion of a motor frame, to which are secured end members 2 and 3 in the usual manner by bolts or screws 4. The end members 2 and 3 support the journals 5 in which is mounted the shaft 6. The armature, not shown, and the collector rings 7 are carried upon said shaft 6 in the usual manner. The end member 2, at the ring end of the motor, supports its journal 5 by spaced arms 8, there being four such arms in the motor shown in Fig. 1.

My commutator dresser attachment comprises a body or frame 9, Figs. 1, 2 and 3, adapted to lie substantially parallel to one of the motor frame arms 8, and provided with a clamp 10 extending around and beneath said arm, as shown particularly in Figs. 2 and 3. Set screws 11, 12 and 13, are respectively positioned to bear against the sides and bottom of said arm 8, as shown. An arm 14, secured to or formed integrally with the body 9, rises from one end thereof, and is provided at its upper end with a pair of convex washers 15 forming, in effect, a ball end. The washers 15 are secured to the end of the arm 14 by a sleeve 16 whose ends are flanged or flared outwardly, as shown in Fig. 2.

The arm 14 is secured to the motor frame by means of a bolt or screw 17, adapted to be substituted for one of the end plate bolts 4, as shown in Figs. 1 and 2. This bolt or screw 17 is of smaller diameter than the sleeve 16, so as to have considerable play therein, and is passed through a spacing sleeve 18 and a washer 19, both having concave surfaces adapted to bear against and be clamped upon the ball end of the arm 14 when the bolt 17 is screwed home. By this arrangement, the arm 14 may have considerable latitude of adjustment, and, together with the set screws 11, 12 and 13, provides an adjustable but firm means for attaching the device to the motor frame.

By providing a number of bolts 17 and spacing sleeves 18, of different lengths, the device may be made adaptable to motors of considerable variety in size.

The body 9 has secured to or formed integral with its ends a pair of laterally extending arms 20, Fig. 1, which terminate in split rings 21 forming bearings or journals for a longitudinally disposed member 22. Clamp bolts 23 are provided in the split journals 21 to adjust the same or to lock the member 22 in any desired position. At one end, said member is provided with a shoulder 24 and a thrust washer 25, Fig. 2, between which the journal 21 is held, to prevent end play of said member 22. A thrust screw 26 holds the washer 25 in position.

The member 22 is provided with a longitudinally disposed slot 27, Figs. 1, 2 and 4, and is surrounded by a longitudinally slidable tool holding carriage 28, which is provided with a key 29 adapted to ride in said slot, said key being preferably held in position by bolts 30. The key 29 is threaded upon a lead screw 31, positioned in the slot 27 and provided with a journal 32 and a thrust bearing 33 in the end portion of the member 22, as shown in Fig. 2. A crank or handle 34 is provided upon the projecting end of said screw, by which it may be rotated to move the tool carriage 28 along the member 22.

The carriage 28 has extending from it a bracket 35, in which a tool holder 36 is adjustably held by means of a socket 37 and a set screw 38. The tool holder 36 may be of any suitable shape, and at its lower end, is provided with a socket 39 for the reception of a cutter 40. The latter is held in place by a set screw 41, and is positioned in cutting relation to the collector rings 7, as indicated in Fig. 3.

In order to provide a cross feed for the tool holder and cutter, to move the latter toward or away from the rings 7, means are provided for turning the member 22 in its journals 21. Such means comprise an arm 42, Figs. 2, 3 and 4, bolted to the end of the member 22 and extending laterally therefrom, and a cross feed screw 43 having threaded engagement with a nut 44 connected with said arm by a swivel joint 45, Fig. 2. The cross feed screw is journaled in a sleeve 46 which has a swivel connection at 47 with the body 9, as shown in Figs. 2 and 4, and said screw is provided with a crank or handle 48 and with a thrust collar 49, Fig. 3, the journal sleeve 46 lying between said collar and a spacer 50 extending to said handle, as shown. Thus by turning the cross feed screw 43, the member 22 is rocked to move the cutter 40 toward or away from the work.

The rotors of electric machines commonly have considerable end play, which must be taken up in order properly to turn down the commutator or collector rings. For this purpose I provide a thrust device comprising a U-shaped yoke 51, Fig. 1, having inwardly turned ends 52 adapted to be hooked over two opposite frame arms 8, and a center screw 53 threaded through said yoke and having a conical end 54 adapted to engage the center bore 55 in the end of the shaft 6, so that, by properly adjusting said screw 53 the end play is taken out of said shaft. A lock nut 56 may be provided for the screw 53.

I also provide means for turning the motor shaft 6 by hand during the dressing operation, comprising a bar 57, Fig. 1, having spaced laterally disposed arms 58 and 59 respectively. A clamping screw 60 is threaded through the arm 59, and is adapted to clamp the bar 57 upon the motor pulley 61, as shown. The outer end portion of the bar 57 is provided with a handle 62, preferably rotatably mounted upon said bar, which forms a crank by which the shaft 6 may be turned.

In the operation of my device, the body 9 is secured in position by removing one of the motor end bolts 4 and substituting the bolt 17 therefor, and by tightening the set screws 11, 12 and 13 upon the motor frame arm 8. These set screws are preferably made with sharp points, as shown, so that they may be set into the arm 8 by tapping their heads with a hammer, thus making the attachment of the device secure and rigid.

The end play adjusting yoke and screw 51 and 53 are then placed and adjusted, and the crank bar 57 secured to the motor pulley 61. Then, by turning the shaft 6 in the proper direction by means of said crank (or by any other convenient means), and by feeding the cutter 40 by means of the cross feed screw 43 and the lead screw 31, the surfaces of the collector rings 7 can be accurately and swiftly turned down to a smooth finish. The device is then removed and the motor is again ready for service.

I claim:—

1. A commutator dresser for electric machines having an end frame member provided with a substantially radially disposed arm, said dresser comprising an elongated body adapted to be positioned parallel with the face of the commutator; a clamp member extending laterally from said body and adapted to partially surround and to be removably secured upon said frame arm; a journal bracket extending laterally from each end of said body; an elongated member extending between said journal brackets and mounted for oscillation therein, the axis of said member being parallel with the face of the commutator; a tool carriage mounted upon said member and slidable longitudinally thereon; a dressing tool mounted in said carriage and extending laterally therefrom; an arm secured to and extending laterally from said member; and an adjustable connection between said arm and the body, whereby said member may be oscillated to carry the tool toward or away from the surface of the commutator.

2. A commutator dresser for electric machines having a central frame member and an end frame member provided with a substantially radially disposed arm and secured to said central member by a bolt, said dresser comprising a clamp adapted to partially surround said arm; means for securing said clamp in position upon said arm; a body secured to said clamp; a bracket extending from said body and adapted for engagement by said bolt; a tool carriage mounted on said body; a dressing tool held by said carriage; and means for moving said carriage to position said tool in operative relation to the commutator of the machine.

In testimony whereof I have signed my name to this specification.

ALONZO LEWIS HALLIDAY.